(12) United States Patent
Jeran et al.

(10) Patent No.: US 12,248,718 B1
(45) Date of Patent: Mar. 11, 2025

(54) MODIFYING PRINT JOB TO HAVE ONE FEWER PAGE WHEN CONTENT ON LAST PAGE SATISFIES RESIDUE THRESHOLD

(71) Applicant: Hewlett-Packard Development Company, L.P., Spring, TX (US)

(72) Inventors: Paul L Jeran, Boise, ID (US); Gabriel Scott McDaniel, Boise, ID (US); Teresa Marie O'Keeffe, Boise, ID (US); Ella Grace Brucker Suznevich, Boise, ID (US); Jeffrey Michael Frechette, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/413,693

(22) Filed: Jan. 16, 2024

(51) Int. Cl.
*G06F 3/12* (2006.01)

(52) U.S. Cl.
CPC ......... *G06F 3/1253* (2013.01); *G06F 3/1204* (2013.01)

(58) Field of Classification Search
None
See application file for complete search history.

(56) References Cited

U.S. PATENT DOCUMENTS

2011/0317184 A1* 12/2011 Ono .............. G03G 15/1695
358/1.9
2024/0132311 A1* 4/2024 Harada ............ G03G 15/6529

* cited by examiner

*Primary Examiner* — Frantz Bataille
(74) *Attorney, Agent, or Firm* — Michael Dryja

(57) ABSTRACT

That content on a last page of a print job having multiple pages satisfies a residue threshold is detected. In response to detecting that the content on the last page satisfies the residue threshold, the print job is modified to have one fewer page. A printing device is caused to print the modified print job.

20 Claims, 7 Drawing Sheets

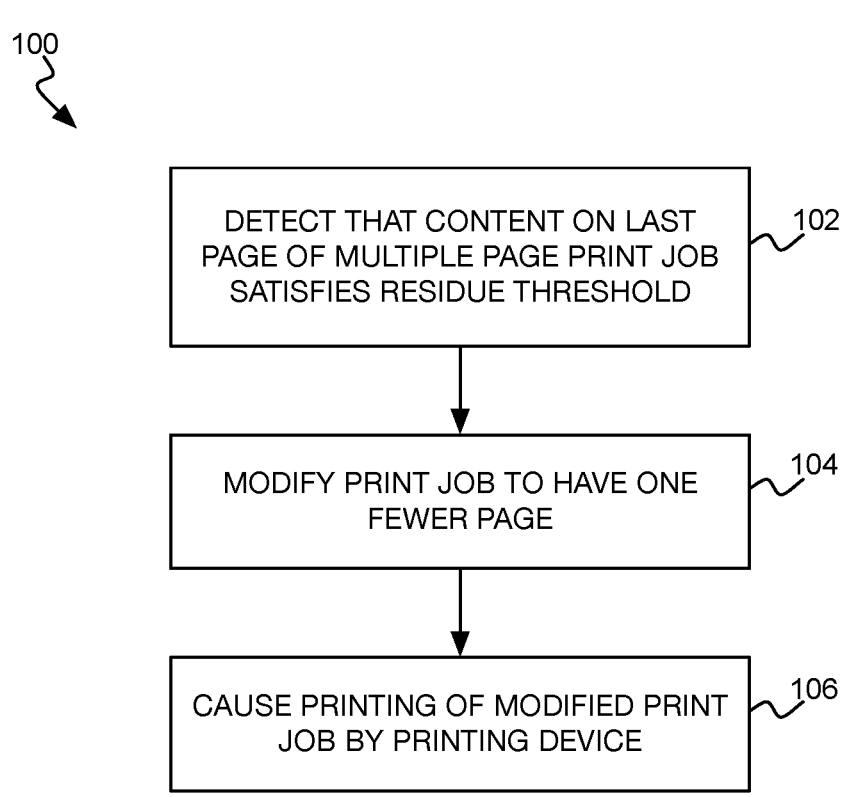

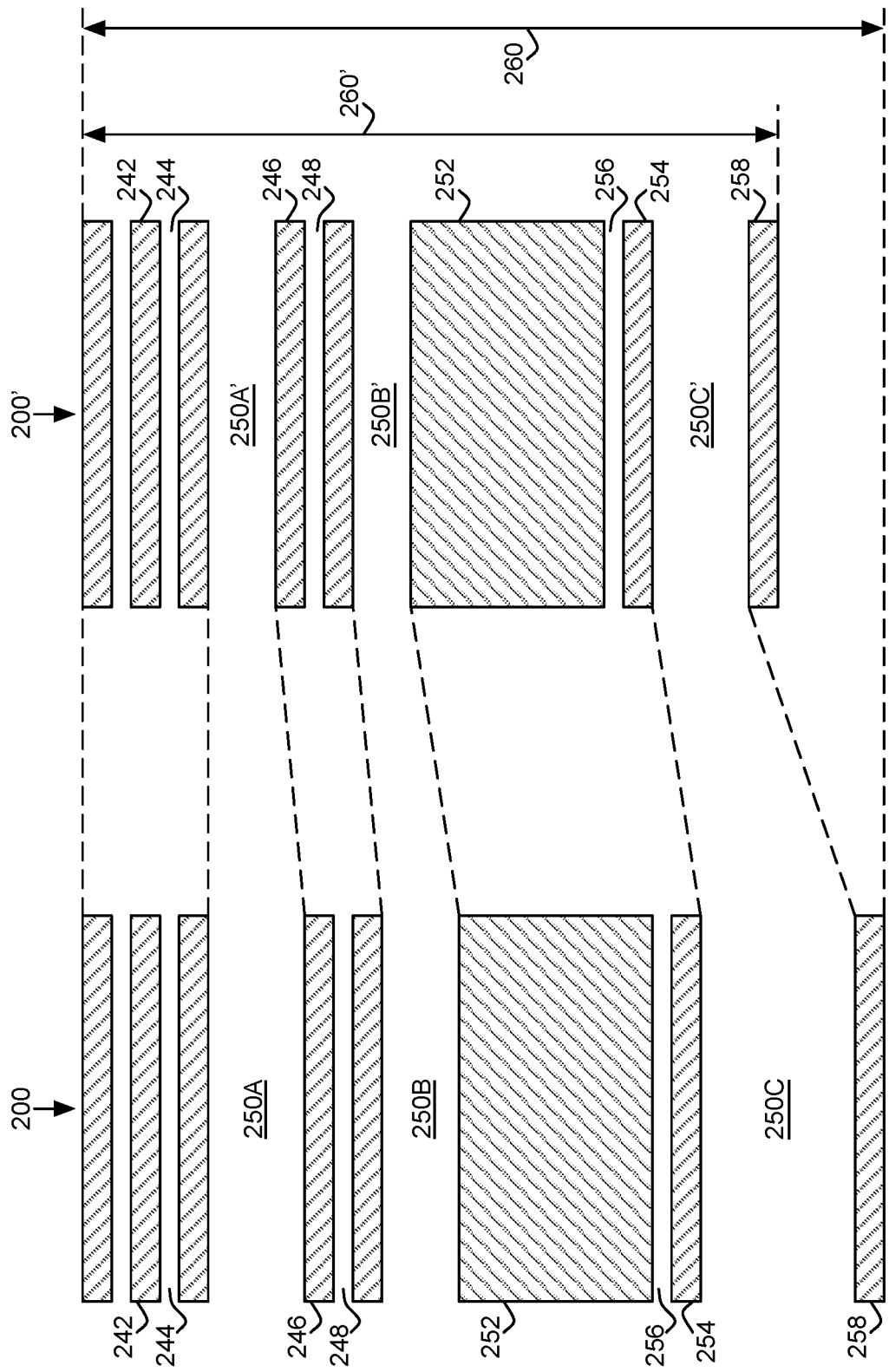

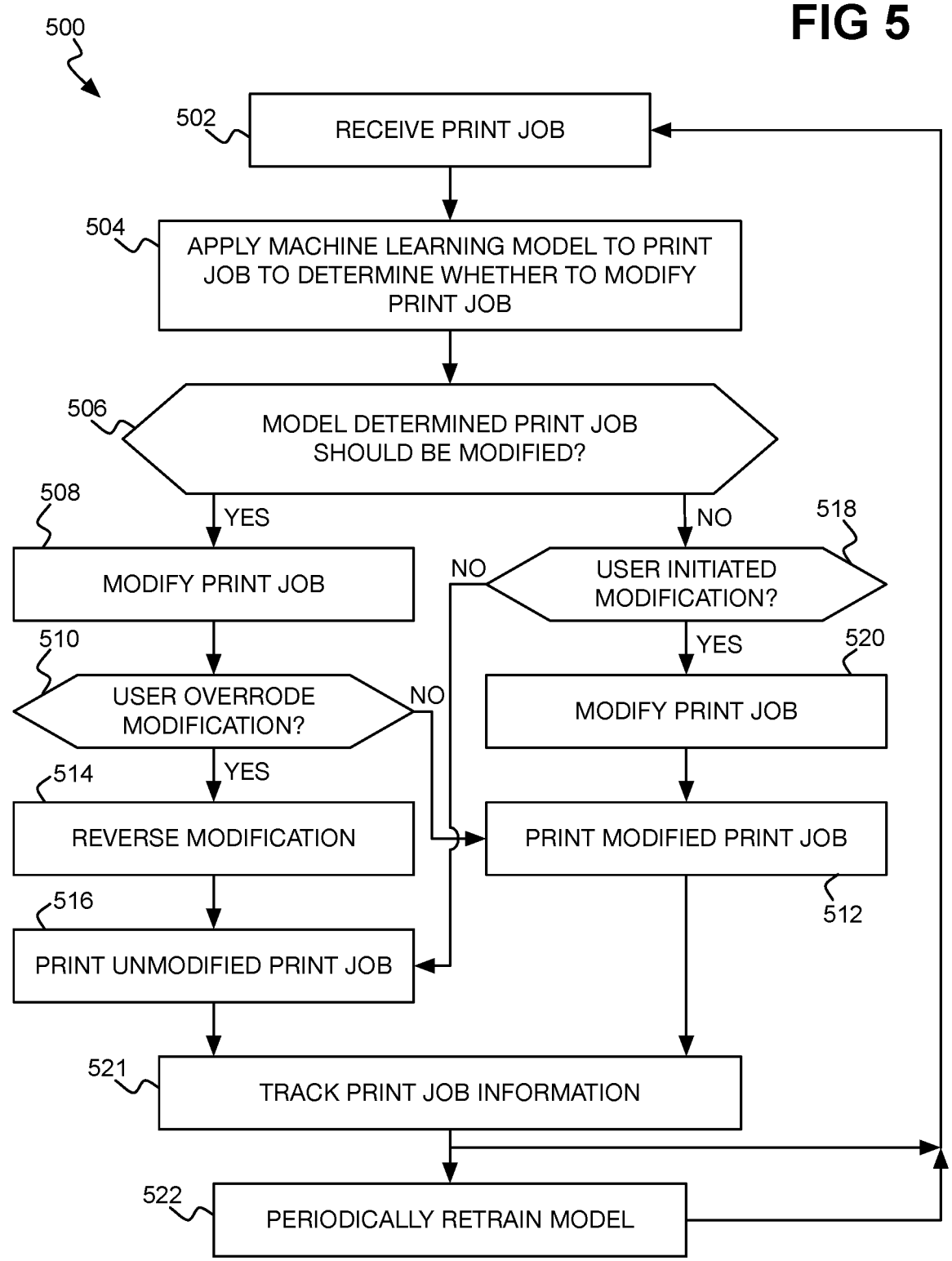

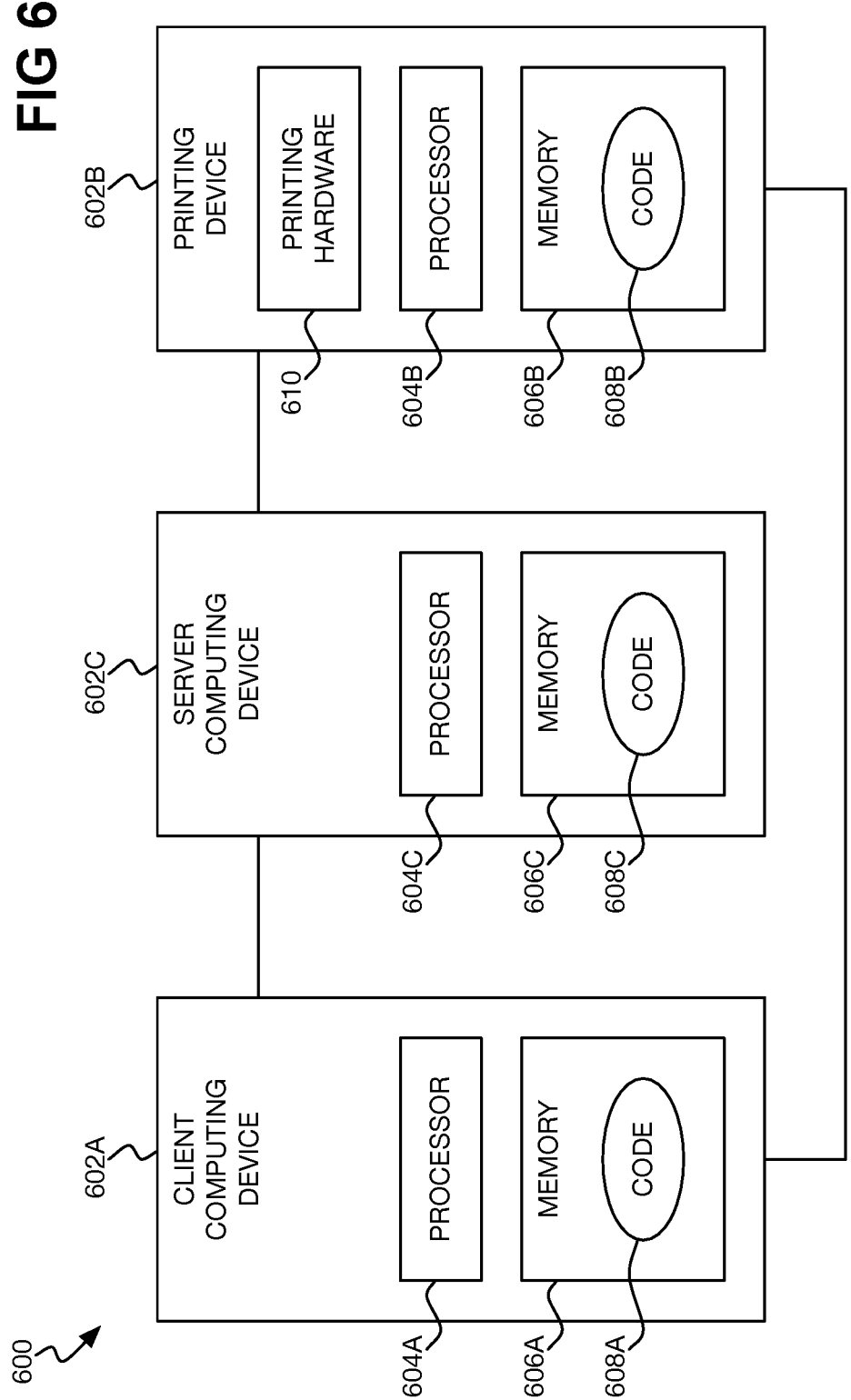

MODIFYING PRINT JOB TO HAVE ONE FEWER PAGE WHEN CONTENT ON LAST PAGE SATISFIES RESIDUE THRESHOLD

BACKGROUND

Using printing devices to print hardcopies of electronic documents, such as email, word processing documents, spreadsheets, web pages, and other types of documents, has remained popular in a variety of different contexts. Such contexts include personal settings as well as organizational settings, such as enterprise, small business, and governmental environments, among others. Printing devices include standalone printers and all-in-one (AIO) devices that provide other functionality in addition to printing functionality, such as scanning, copying, and/or faxing functionality.

BRIEF DESCRIPTION OF THE DRAWINGS

FIG. 1 is a flowchart of an example method to modify a print job to have one fewer page before the print job is printed.

FIGS. 2B, 2C, 2D, and 2E are diagrams of different example ways by which to modify a print job, such as that of FIG. 2A, to have one fewer page while preserving all the content of the print job.

FIG. 5 is a flowchart of an example method for using a machine learning model to detect whether the content on the last page of a print job satisfies a residue threshold.

FIG. 6 is a diagram of an example architecture in relation to which print jobs can be modified to have one fewer page before being printed.

DETAILED DESCRIPTION

Figure 2A:
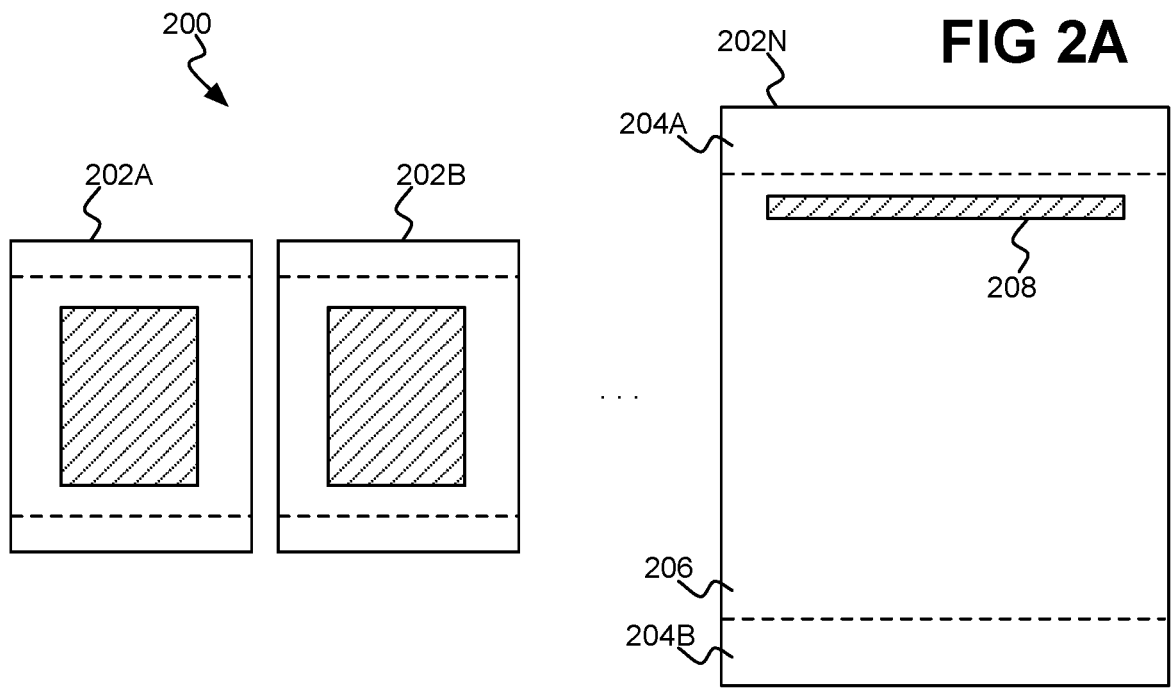
FIG. 2A is a diagram of an example print job having content on its last page that satisfies a residue threshold in that the content is between the header and footer areas on the last page and the amount of the content is less than a size threshold.

When an electronic document is to be printed by a printing device, a print job for the document is generated and transmitted to the printing device, which then prints the print job. A print job may have multiple pages depending on its corresponding electronic document. For example, a word processing document may be more than one page, an email or web page may be sufficiently long that it is printed over multiple pages, and so on.

Often, however, the content on the last page of a print job can be considered "residue" that does not have to be printed or that otherwise unnecessarily wastes paper (or other media) when printed on a separate sheet. For example, if the last page only includes a header and/or a footer and not any content other than whitespace in-between, the last page does not have to be printed. As another example, if the last page includes only low value content, such an email signature, an advertisement, and so on, the last page may not have to be printed.

As a third example, the amount of content on the last page may be very limited, and while important in that the content should still be printed, ideally it would not be printed on its own page. For instance, the last page of the print job for a word processing document may include just a small number of lines of text. In this case, ideally the entirely document (including these lines) is still printed, but in such a way that one fewer page is needed.

While for any given print job the unnecessary wastage of a media sheet to print the last page of the print job may be considered inconsequential, on a large scale the wastage can be costly. A given individual may not personally print that many print jobs having last pages with residue content, for instance, but the amount of paper or other media wasted across all users over the globe can represent a not insubstantial wastage of resources needed to manufacture and transport the media.

Similarly, at an enterprise or other organizational level, the amount of paper that a given employee wastes printing print jobs with residue content on their last page may be small, but the amount of paper or other media wasted across the entire enterprise in this manner can add up. The monetary expense in procuring media that is ultimately wasted, let alone the expense in procuring ink, toner, or other colorant to print residue content that did not have to be printed, can be not insignificant.

FIG. 1 shows an example method 100 that can ameliorate these and other issues. The method 100 includes detecting that the content on the last page of a print job having multiple pages satisfies a residue threshold (102). The content on the last page of a print job satisfies a residue threshold in that the content on the last page does not need to be printed, or that the content should still be printed, but not on its own page.

The method 100 includes, in response to detecting that the content on the last page satisfies the residue threshold, modifying the print job to have one fewer page (104). The last page of the print job may simply be removed, for instance, such that the content that satisfies the residue threshold is no longer part of the print job. The print job may instead be modified to have one fewer page without removing the content that satisfies the residue threshold.

The method 100 includes then causing the modified print job to be printed by a printing device (106). Because the print job has one fewer page after modification, printing the print job can use one fewer sheet of paper or other media. The method 100 can be performed without user interaction. For example, once a user has set a corresponding setting, any time the user then prints a print job it is modified to have one fewer page before printing if the content on the last page satisfies the residue threshold.

The method 100 may also be performed with user interaction. For example, when the content on the last page of a print job has been detected as satisfying the residue threshold, a proposed modification to the print job may be presented to the user before the print job is actually printed. The user may override the modification such that the print job is printed without modification, or the user may modify the print job in a different way to have one fewer page.

A print job may be simplex or duplex. A *simplex* print job is printed in a single-sided manner on media sheets, such that just one side of each sheet is printed on. The number of media sheets printed on thus corresponds of the number of pages of the print job. This means that modifying the print job to have one fewer page reduces the number of media sheets that are used.

Therefore, a simplex print job may be modified to have one fewer page when the content on its last page satisfies the residue threshold regardless of whether the last page is an even-numbered or odd-numbered page. That is, regardless of whether the print job has an even number or an odd number of pages, modifying the print job to have one fewer page reduces the number of media sheets that are printed on.

A duplex print job, by comparison, is printed in a double-sided manner, such that both sides of each sheet of media except the last sheet are printed on, and either or both sides of the last sheet are printed on depending on whether the print job has an even or odd number of pages. If the print job has an even number of pages, then both sides of the last sheet of media are printed on, whereas if the print job has an odd number of pages, just one side of the last sheet is printed on.

The number of media sheets printed on thus does not correspond to the number of pages of a duplex print job. Modifying the print job to have one fewer page reduces the number of media sheets that are used only if the job has an odd number of pages. If the print job has an even number of pages, modifying the job to have one fewer page just means that one side, as opposed to both sides, of the last sheet is printed on. Therefore, a duplex print job may be modified to have one fewer page when the content on its last page satisfies the residue threshold only if its last page is an odd-numbered page.

Furthermore, if the print job is duplex and has two pages, the print job may still be modified to have one fewer page even though the number of media sheets that will be used will not be reduced. This is so that the user does not have to flip over the sole sheet that is printed on just to see a small amount of content on the back side of the sheet. Moreover, if the sheet were posted on a wall, corkboard, etc., inserted into a binder sleeve, and so on, the portion of the print job on the back side would not be visible. Modifying a duplex print job to have one fewer page in such cases that the entire print job will fit on the front side of the sole sheet that is printed on.

FIG. 2A shows an example print job 200 having multiple pages 202A, 202B, . . . , 202N, which are collectively referred to as the pages 202.

Each page 202 may include a header area 204A and a footer area 204B between which there is a primary content area 206. There may not be an actual header in the header area 204A or an actual footer in the footer area 204B (i.e., there may not be actual content in either or both of areas 204A and 204B). Further, not every page 202 may include a header and/or footer, and different pages 202 can have different headers and/or footers.

The print job 200 includes content 208 (including at least some content other than whitespace) in the primary content area 206 on the last page 202N. The amount of content 208 is less than a size threshold. For example, the area (or height) of a bounding box surrounding the content 208 as a percentage of the primary content area 206 (or its height) or the total area (or height) of the page 202 may be less than a corresponding size threshold.

As another example, the vertical height of the content 208, as measured in lines of text or a standard unit of measure such as inches, centimeters, and so on, may be less than a corresponding size threshold. FIG. 2A thus shows one way to detect that the content 208 on the last page 202N of a print job 200 satisfies the residue threshold, by detecting that the amount of content 208 in the area 206 is less than a size threshold. This content 208 should still be printed, but not on its own page.

FIGS. 2B, 2C, 2D, and 2E show different example ways by which the print job 200 can be modified to have one fewer page while still preserving all its content. All the content of the print job 200 is preserved in that the content 208 in the primary content area 206 on the last page 202N is not removed from the print job 200. Rather, the print job 200 is modified so that one fewer page is needed to print all its content, including the content 208.

Figure 2B:
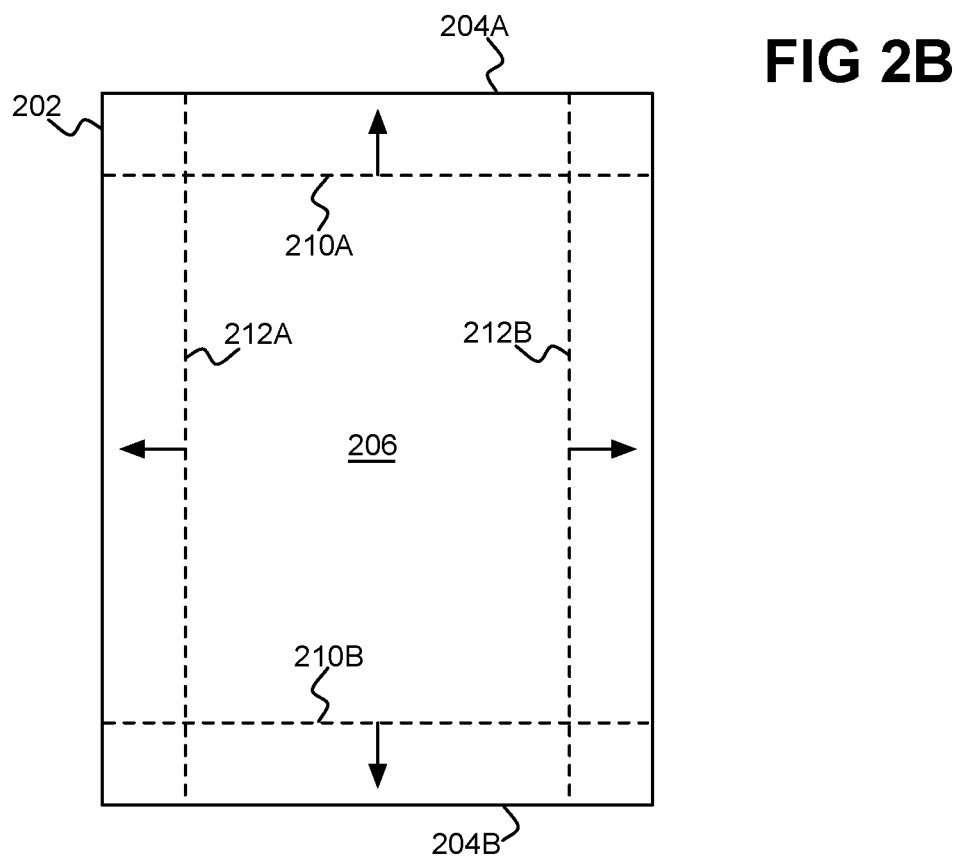

In FIG. 2B, either or both of the top margin 210A and bottom margins 210B (collectively referred to as the margins 210) and/or either or both of the left margin 212A and right margin 212B (collectively referred to as the margins 212) are adjusted outwards (i.e., reduced) on each page 202. Therefore, the size of the primary content area 206 defined by the margins 210 and 212 is increased, which increases how much content of the print job 200 can fit on each page 202.

The margins 210 and/or 212 can be reduced by the smallest amount needed so that the content of the print job 200 fits on one fewer page than before. There may be settings that the user can adjust to specify which of the margins 210 and/or 212 should be reduced. The greater the total amount of content the print job 200 has, the lesser the margins 210 and/or 212 have to be reduced so that the content fits on one fewer page.

For example, a print job 200 having forty pages and a single line of text on the last page does not have to have the margins 210 and/or 212 reduced as much as a print job 200 having three pages and a single line of text on the last page. This means that with increasing print job length, the less perceptible the modification of the print job 200 to have one fewer page will be.

Another way to increase how much content fits on each page 202 is to scale the print job 200. For instance, the print job 200 may be scaled to a percentage of its original size, such as between 90-99% as an example. In one implementation, the print job 200 as a whole may be scaled in this way. In another implementation, just the text content of the print job 200 may be scaled, or just the graphic content (e.g., images, including images of text) may be scaled. There may be a setting that the user can adjust to specify whether just text content, just graphic content, or both should be scaled.

Figure 2C:
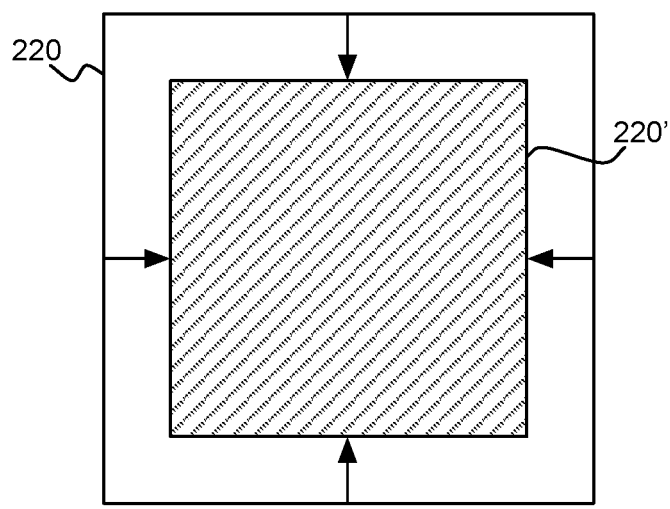

In FIG. 2C, for instance, graphic content 220 of the print job 200 may be scaled to reduce its size, where after such modification of the print job 200 the graphic content 220 is denoted as the shaded graphic content 220'. The graphic content 220 can be scaled by the minimum amount needed so that the print job 200 fits on one fewer page than before.

It is noted that the graphic content 220 may be scaled based on its type, such that the type of the graphic content 220 is (e.g., as an image, as a spreadsheet chart, etc.) and then the content 220 is accordingly scaled. For instance, images may be scaled so that their aspect ratio is preserved, whereas spreadsheet charts may be able to be scaled differently in the horizontal and vertical directions.

Figure 2D:
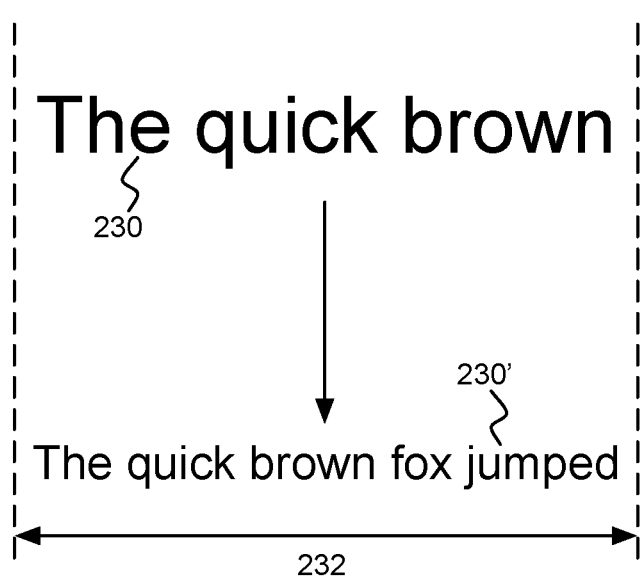

In FIG. 2D, by comparison, textual content 230 of the print job 200 may be scaled to reduce its size, such that after modification of the print job 200 the textual content 220 is denoted as the textual content 230'. Therefore, more characters can fit in a given horizontal width 232 after modification. (Similarly, more lines of text can fit in a given vertical height after modification.)

Scaling the textual content 230 can be performed by reducing font size. The textual content 230 can be scaled by the minimum amount needed so that the print job 200 fits on one fewer page than before. For instance, the font size of the textual content 230 can be reduced by the minimum amount needed so that the print job 200 fits on one fewer page than before.

In FIG. 2E, another way to increase how much content fits on each lines 242 of text separated by whitespace 244. For example, the lines 242 may be single spaced, double spaced, etc., such that there is one space between adjacent lines 242. The print job 200 also includes two lines 246 of text separated by whitespace 248, where the lines 246 are separated from the lines 242 by a larger amount of whitespace 250A.

The print job 200 includes an image 252 and a line 254 of text separated by whitespace 256, where the image 252 is separated from the lines 246 by a larger amount of whitespace 250B. The print job 200 also includes a single line 258 of text separated from the line 254 by a larger amount of whitespace 250C. The whitespace 250A, 250B, and 250C are collectively referred to as the whitespace 250.

The print job 200 therefore has an overall vertical height 260 that can require multiple pages. For instance, all the content except the line 258 of text and a trailing portion of the whitespace 250C may fit on a first page of the print job 200, and the line 258 and the trailing portion of the whitespace 250 may be arranged on a second, last page of the print job 200.

To modify the print job 200 to increase how much non-whitespace content in particular fits on each page 202, whitespace between vertically consecutive non-whitespace content that is vertically greater in size than a whitespace size threshold is shortened in height. In the example, the whitespace 250 are each vertically greater than the whitespace threshold, whereas the whitespace 244, 248, and 256 are not.

Therefore, just the whitespace 250 is shortened in height. The vertical height of each whitespace 250 may be reduced by the same amount or by the same percentage. The whitespace 250 is reduced shortened just as much that is necessary so that the print job 200 fits on one fewer page than before. Such shorter whitespace 250 is indicated as the whitespace 250A', 250B', and 250C', collectively referred to as the whitespace 250', in the resulting modified print job 200'.

The modified print job 200' therefore has a shorter overall vertical height 260' that requires one fewer page than before. For instance, after print job modification, all the content including the line 258 of text and the entire portion of the shortened whitespace 250C' may fit on one page of the print job 200', whereas before modification, the line 258 and a trailing portion of the whitespace 250 were on their own page.

Shortening just the whitespace 250 between vertically consecutive non-whitespace content that is vertically greater than a whitespace size threshold can be less perceptible and more aesthetically pleasing than if the whitespace 244, 248, and 256 were also shortened. For example, if the whitespace 250' are each a quarter of inch smaller in height than their corresponding whitespace 250, this is is less likely to apparent than if the whitespace 244, 248, and 256 were reduced from being double spaced to being single spaced.

The different ways by which a print job can be modified while still preserving all its content, including the content on the last page of the print job, which have been described with reference to FIGS. 2B-2E, can be used individually and in any combination. For example, a user may be able to specify which ways should be used, and the order in which they should be used. For each particular technique, a user may specify parameters indicating how much the page can be accordingly modified.

A user may, for instance, specify that margins can be reduced and that a print job can be scaled so that the print job fits in one fewer page, in that order. The user may specify that the margins can be reduced by up to 5%. Therefore, if at even a 5% reduction in margins the print job still does not have one fewer page, the print job (with the reduced margins) is then scaled until it does have one fewer page.

Figure 3:
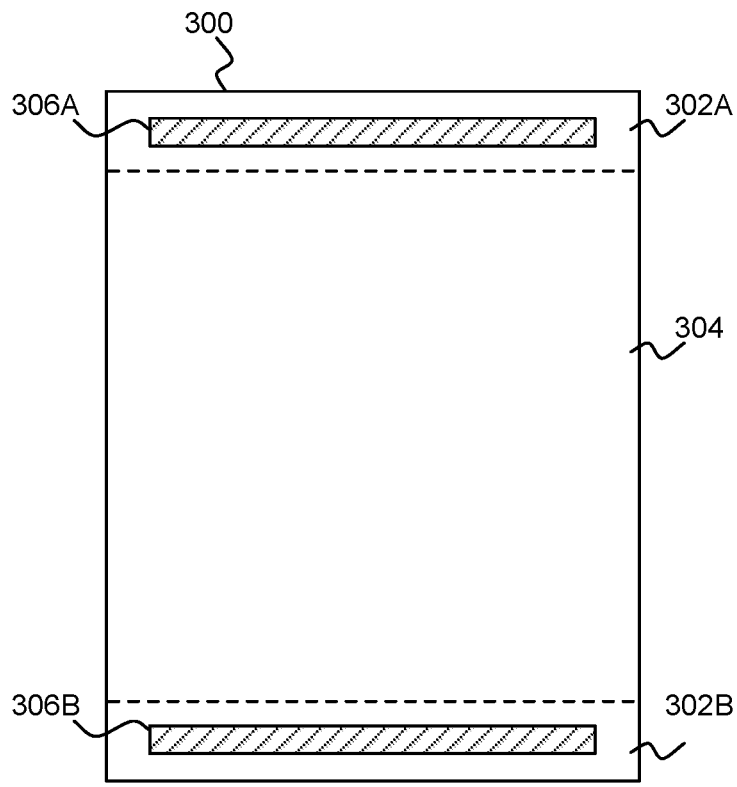
FIG. 3 is a diagram of the last page of another example print job having content that satisfies a residue threshold in that the content is between the header and footer areas and is just whitespace.

FIG. 3 shows a last page 300 of another example multiple-page print job. The page 300 includes a header area 302A and a footer area 302B between which there is a primary content area 304. The header area 302A and the footer area 302B respectively include a header 306A and a footer 306B that are actual content and not just whitespace. By comparison, the primary content area 304 does not include any actual (non-whitespace) content, and includes just whitespace.

The print job including the last page 300 may correspond to a word processing document, for instance, having a number of carriage returns at the end of its main, non-whitespace content (i.e., content other than headers and footers). The last page 300 only includes at least some of these carriage returns, and no other part of the main content. If the document did not include the header 306A and the footer 306B on the last page 300, then the last page 300 would be blank and the media sheet it is printed on could be reused.

However, because the last page 300 includes the header 306A and the footer 306B, the media sheet on which the page 300 is printed cannot be reused, and thus is wasted. That is, because the last page 300 does not include any non-whitespace main content of the document, the last page 300 does not need to be printed (and a user would not notice if it were not printed). Therefore, the print job can be modified by simply removing the last page.

Because headers and footers are generally repeated on the pages of a document, this allows for detecting the header 306A and the footer 306B on the last page 300. For instance, if the page 300 includes content at the top that is similar or identical to content at the top of other pages, then this content can be detected as the header 306A. Similarly, if the page 300 includes content at the bottom that is similar or identically to content at the bottom of other pages, then this content can be detected as the footer 306B.

FIG. 3 thus shows another way to detect that the content on the last page 300 of a print job satisfies the residue threshold, by detecting whether this content includes only (non-whitespace) content in either or both of the header area 302A and footer area 302B, and does not include content other than whitespace in the area 304. When the residue threshold is satisfied in this manner, the last page 300 is removed from the print job.

Figure 4:
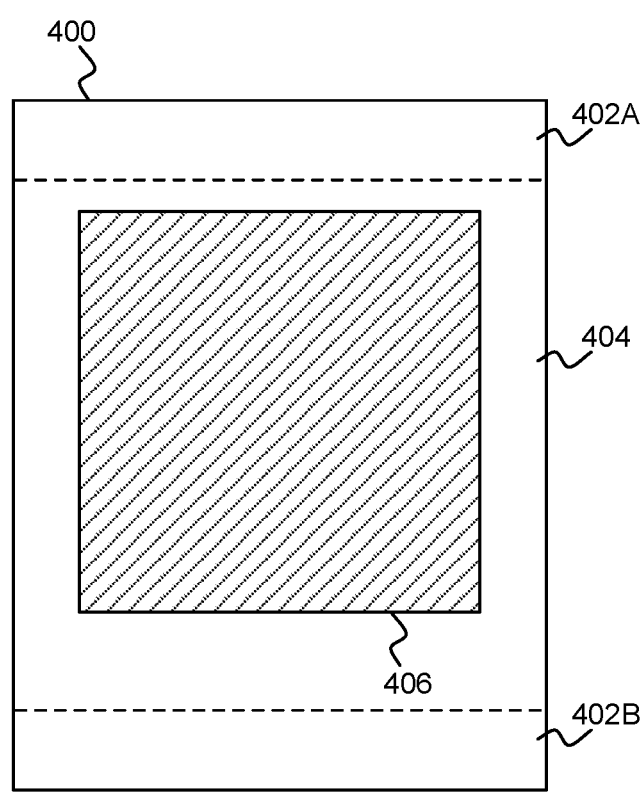
FIG. 4 is a diagram of the last page of a third example print job having content that satisfies a residue threshold regardless of the amount of the content, in that the content is between the header and footer areas and has a content value less than a content value threshold.

FIG. 4 shows a last page 400 of another example multiple-page print job. The page 400 includes a header area 402A and a footer area 402B between which there is a primary content area 404. The header area 402A may include a header, and/or the footer area 402B may include a footer, although this is not depicted in the figure. The primary content area 404 includes (non-whitespace) content 406.

The content 406 in the primary content area 404 can have a vertical height greater than the size threshold that would otherwise result in modification of the print job so that the content 406 is still printed but not on its own page. However, the content 406 may be of low value, and therefore still be considered to satisfy the residue threshold. That is, the content 406 may have a content value less than a content value threshold. The content 406 may be boilerplate content, for instance, or another type of content that is of low value.

For example, if the print job including the last page 400 corresponds to an email message, the content 406 may be an email signature block (or a part thereof), or a quoted portion of a prior email message (or a part thereof) to which the email message is in response. From the perspective of a user who is printing the email message, such content 406 may be considered as low value, and not the reason why the email is being printed.

As another example, if the print job including the last page 400 corresponds to a web page, the content 406 may be just an advertisement displayed on the web page, just the navigation controls displayed on the web page, or another content type that is of low value. Here, too, from the perspective of a user who is printing the web page, such content 406 is not the reason why the web page is being printed.

FIG. 4 thus shows a third way to detect that the content on the last page 400 of a print job satisfies the residue threshold, by detecting whether the content 406 in the area 404 between the header area 402A and the footer area 402B has a content value less than a content value threshold. Because the content 406 is of low value, the last page 400 does not need to be printed. When the residue threshold is satisfied in this manner, therefore, the last page 400 can simply be removed from the print job.

That the content 406 has a content value less than the content threshold value can be detected by detecting whether it is any of a number of particular types of content that are considered as having low value. For instance, if the content 406 is detected as being boilerplate content, advertisement content, an email signature block, a quoted portion of a prior email message, and so on, then the content 406 is detected as having low content value.

In another implementation, the content type of the print job as a whole may be detected. Specific content types associated with the content type of the print job, and which have been identified as having low content value, may then be retrieved. Whether the content 406 is any of these specific content types is detected. The content type of the print job as a whole may itself be detected based on the application from which the corresponding document was received.

For example, if email client software initiated printing, then the print job may be classified as an email message (i.e., an email message content type). The specific low value content types associated with email messages may be an email signature block and a quoted portion of a prior email message, such that whether the content 406 is any of these specific content types is detected to determine whether the content 406 is of low content value.

As another example, if web browsing software initiated printing, then the print job may be classified as a web page (i.e., as a web page content type). The specific low value content types associated with web pages may be advertisement content and navigation controls content, such that whether the content 406 is any of these specific content types is detected to determine whether the content 406 is of low content value.

FIG. 5 shows an example method 500 for detecting whether the content on the last page of a print job satisfies a residue threshold by using a machine learning model. The machine learning model may have been trained on training data made up of last pages of print jobs and whether they are each considered to satisfy the residue threshold or not. The machine learning model may be a convolutional neural network (CNN), for instance, which may employ an object detection technique such as region-based CNN (R-CNN), fast R-CNN, or the technique known as "you only look once" (YOLO).

The method 500 includes receiving a print job (502), and applying the machine learning model to the print job to determine whether the print job should be modified to have one fewer page (504). That is, the print job (i.e., at least the last page thereof) is input to the machine learning model, and the model outputs whether the print job should be modified to have one fewer page. The model may output a score corresponding to the likelihood that the content on the last page satisfies the residue threshold.

In response to the machine learning model indicating that the last page of the print job satisfies the residue threshold and thus should be modified to have one fewer page (506), the method 500 includes modifying the print job so that it has one fewer page (508). The print job may be modified as has been described above in relation to FIGS. 2B-2E, or the machine learning model may itself indicate that the last page should simply be removed per FIGS. 3 and 4.

For instance, the training data used to train the machine learning model may indicate, for those print job with last pages having content considered as satisfying the residue threshold, whether the last pages should be removed or not. Therefore, the machine learning model can also be trained to output whether the last page of an input print job should be removed.

When applied to the print job, the machine learning model may indicate that the content on the last page satisfies the residue threshold but does not indicate that the last page should be removed. In this case, the print job may be modified to have one fewer page in a way that still preserves this content, such as per FIGS. 2B-2E.

By comparison, the model may instead indicate that the content satisfies the residue threshold and that the last page should be removed. For instance, there may be no content on the last page other than a header and/or footer, or the type of the content on the last page may have low content value. In these cases, the print job may be modified by simply removing the last page.

The user may be able to override modification of the print job. To indicate why the print job has been modified, a corresponding message may be displayed to the user. For instance, there may be an indication that the print job has been optimized for sustainable printing (e.g., to use fewer sheets of media), or a corresponding icon that indicates this information may be displayed. Whether such a message or icon is displayed may be controlled by a setting that the user can modify, or in the case of an enterprise or other organization, an administrator can adjust for all users. In the latter case, the administrator may further be able to specify whether end users are permitted to adjust the setting.

Other information may also be displayed. For example, the number of sheets of media that have been saved when printing print jobs in the past may be tracked and displayed each time a print job that is to be printed is modified. The number of sheets may be tracked on a per-user basis, a per-printing device basis, and/or for an organization as a whole. The number of sheets may be tracked for a given period of time, such as over the last specified number of days, months, weeks, and so on, and the number may be able to be reset by a user.

The method 500 includes, if the user has not overridden modification (510), printing the modified print job (512). The method 500 can include, by comparison, if the user has overridden the modification (510), reversing the modification (514), and printing the unmodified print job (516) (i.e., the print job prior to modification). The user may also be able to instead adjust how the print job is modified.

If the model indicates that the last page of the print job does not satisfy the residue threshold and thus should not be modified to have one fewer page (506), the user may still be able to modify the print job. The method 500 includes, if the user has initiated such modification (518), accordingly modifying the print job as specified by the user (520), and then printing the modified print job (512). The method 500 includes, if the user has not initiated modification (518), simply printing the unmodified print job (516).

The method 500 can include tracking print job information (521). The print job information can include at least the last page of the print job as received in 502 (i.e., prior to any modification), and whether the machine learning model indicated that the print job should be modified to have one fewer page. The print job information can also include whether the print job was actually printed to have one fewer page or not, and if so, whether the last page was simply removed for the print job to have one fewer page.

For instance, the machine learning model may have determined that a print job should be modified to have one fewer page, but the user may have overridden this determination such that the unmodified print job was printed. Similarly, the machine learning model may have determined that a print job should be modified to have one fewer page, but the user may have nevertheless modified the print job before printing.

As another example, the machine learning model may have determined that a print job should be modified to have one fewer page by simply removing the last page, but the user may have overridden this determination such that the job was modified to have one fewer page in a way that all of its content was preserved. Similarly, the model may have determined that the print job should be modified to have one fewer page but not by simply removing the last page, but the user may have overridden this determination such that the print job was modified by removing the last page.

The print job information can further include whether, after the job was modified to have one fewer page and then printed, it was reprinted to not have one fewer page. For example, the machine learning model may have determined that the print job should be modified to have one fewer page, and the user may not have overridden this determination before the job was printed. However, the user may have then printed the print job again but without modification, indicating that the user ultimately decided that the job should not have been modified to have one fewer page the first time it was printed.

The method 500 is repeated at 502 as print jobs are received. The method 500 can also include periodically retraining the machine learning model (522), based on the tracked print job information of a number of print jobs (including the number of media sheets that have been saved by modifying the print jobs prior to printing). Periodically retraining the machine learning model can improve its accuracy in determining whether an input print job should be modified to have one fewer page and, if so, whether the last page of the print job should simply be removed.

FIG. 6 shows an example architecture 600 (e.g., system) in relation to which print jobs can be modified to have one fewer page before being printed. The architecture 600 includes a client computing device 602A and a printing device 602B. The architecture 600 can also include a server computing device 602C. The client computing device 602A, the printing device 602B, and the server computing device 602C are collectively referred to as the devices 602.

The client devices 602A, 602B, and 602C respectively include processors 604A, 604B, and 604C, collectively referred to as the processors 604. The client devices 602A, 602B, and 602B respectively include memory 606A, 606B, and 606C, collectively referred to as the memory 606. Each memory 606 is an example of a non-transitory computer-readable data storage medium.

The memory 606A, 606B, and 606C respectively store program code 608A, 608B, and 608C, collectively referred to as the program code 608, and which can be considered instructions. The processor 604 of each device 602 executes the program code 608 stored on its memory 606 to perform processing, such as the methods and techniques that have been described.

The client computing device 602A may be a desktop, laptop, or notebook computer, or another type of computing device, such as a smartphone, a tablet computing device, and so on. When a user wants to print an electronic document on the printing device 602B, the user may select a print function from an application or other software running on the client computing device 602A. The application or other software may be email client software, web browsing software, word processing software, spreadsheet software, and so on.

Selection of the print function in the application or other software can initiate execution of a printer driver on the client computing device 602A that generates a print job corresponding to the electronic document. The user may be permitted to select from among different settings and parameters that govern how the print job is to be printed. For example, the user may specify whether the print job is to be printed in simplex or duplex, in color or black-and-white, which pages of the print job are to be printed, and so on.

The client computing device 602A may be able to directly communicate with the printing device 602B. For instance, the client computing device 602A may be directly connected to the printing device 602B in a wired or wireless manner, or it may be communicatively connected to the same (local) network as the printing device 602B. In these cases, the printer driver may transmit the print job directly to the printing device 602B for printing.

The printing device 602B includes printing hardware 610 by which it prints the print job. The printing hardware 610 includes the mechanical and electronic components that the printing device 602B uses to print the print job. For example, the printing hardware 610 may be inkjet-printing hardware or laser-printing hardware, among other types of printing hardware.

In other situations, the client computing device 602A may transmit the print job to the server computing device 602C. The server computing device 602C may be a print server that is communicatively connected to the printing device 602B and may be installed in the same location (e.g., the same building) as the printing device 602B. The server computing device 602C may instead be a web server communicatively connected to both the client computing device 602A and the printing device 602B over the Internet.

In these cases, the printer driver running on the client computing device 602A transmits the print job to the server computing device 602C, and the server computing device 602C transmits the print job to the printing device 602B for printing. The client computing device 602A therefore does not have to able to communicate directly with the printing device 602B.

Detecting that a print job has content on its last page that satisfies a print residue threshold, and modifying the print job to have one fewer page, can be performed by any device 602. Therefore, the methods and techniques that have been described can be performed by any device 602. In the case in which the client computing device 602A performs detection and print job modification (i.e., by a printer driver thereof), the device 602A transmits the modified print job to either the printing device 602B or to the server computing device 602C so that the modified print job is printed. In the case in which the server computing device 602C performs detection and print job modification, the device 602C receives the (unmodified) print job from the client computing device 602A, modifies the print job, and then transmits the modified print job to the printing device 602B for printing.

In the case in which the printing device 602B performs detection and print job modification, the device 602B receives the (unmodified) print job from either the client computing device 602A or the server computing device 602C and modifies the print job before printing it. The printing device 602B may also perform detection and print job modification for locally received and/or generated print jobs, and/or for print jobs that correspond to additional functionality of the device 602B. For example, regardless of whether the printing device 602B is a standalone printer or is an all-in-one (AIO) device that in addition to printing functionality includes additional functionality, such as copying and/or faxing functionality, the device 602B may be able to have a storage device, such as a USB flash drive, directly connected thereto. In this case, the printing device 602B may perform detection and print job modification when a user prints a file stored on such a storage device, such that the print job in question is a locally received and/or generated print job.

When the printing device 602B is an AIO device that includes copying functionality, the device 602B may perform detection and print job modification when a user initiates a copy job. For example, the printing device 602B may have a built-in optical scanner. Therefore, a a user can scan media sheets already having content on them using the printing device 602B, and cause the device 602B to print the scanned sheets. The print job in this case corresponds to the scanned sheets, such that the print job is a locally received and/or generated such print job as to which the printing device 602B can perform detection and print job modification. As a further example, the printing device 602B may include faxing functionality, such that print jobs corresponding to received faxes can be subjected to detection and modification.

Techniques have been described to modify a multiple-page print job to have one fewer page when the content on the last page of the job satisfies a residue threshold. The content on the last page can satisfy the residue threshold in that the amount of the content is less than a corresponding size threshold, in which case the print job may be modified to have one fewer page in a way that still preserves this content.

The content on the last page can satisfy the residue threshold in that there is no non-whitespace content between the header and footer areas on the last page, or in that the content on the last page is of low content value. In either of these cases, the print job may be modified to have one fewer page by simply removing the last page from the print job, such that the content on that page is not printed.

We claim:
1. A method comprising:
   detecting, by a processor, that content on a last page of a print job that has multiple pages satisfies a residue threshold;
   in response to detecting that the content on the last page satisfies the residue threshold, modifying, by the processor, the print job to have one fewer page; and
   causing, by the processor, the modified print job to be printed by a printing device.

2. The method of claim 1, wherein when the print job is simplex, the print job is modified to have one fewer page regardless of whether the last page is an even-numbered page or an odd-numbered page,
   and wherein when the print job is duplex, the print job is modified to have one fewer page only if the last page is an odd-numbered page.

3. The method of claim 1, wherein detecting that the content on the last page satisfies the residue threshold comprises:
   detecting that an amount of content on the last page in an area between a header area and a footer area is less than a size threshold.

4. The method of claim 3, wherein modifying the print job to have one fewer page comprises either or both of:
   reducing either or both of horizontal margins and vertical margins of the print job to increase how much content is printed on each page; and
   scaling the print job to increase how much content is printed on each page.

5. The method of claim 3, wherein modifying the print job to have one fewer page comprises:
   shortening whitespace between vertically consecutive non-whitespace content of the print job that is vertically greater than a whitespace size threshold.

6. The method of claim 1, wherein detecting that the content on the last page satisfies the residue threshold comprises:
   detecting that the content on the last page includes only content in either or both of a header area and a footer area and no content other than whitespace in an area between the header area and the footer area.

7. The method of claim 6, wherein modifying the print job to have one fewer page comprises:
   removing the last page from the print job.

8. The method of claim 1, wherein detecting that the content on the last page satisfies the residue threshold comprises:
   detecting that the content on the last page in an area between a header area and a footer area has a content value less than a content value threshold.

9. The method of claim 8, wherein modifying the print job to have one fewer page comprises:
   removing the last page from the print job.

10. The method of claim 8, wherein detecting that the content on the last page in the area between the header area and the footer area has a content value less than the content value threshold comprises:
    detecting that the content on the last page in the area between the header area and the footer area is:
    boilerplate content;
    advertisement content;
    an email signature block; and/or
    a quoted portion of a prior email message.

11. The method of claim 8, wherein detecting that the content on the last page in the area between the header area and the footer area has a content value less than the content value threshold comprises:

detecting that a content type of the content on the last page is any content type associated with a content type of the print job as a whole.

12. The method of claim 1, wherein detecting that the content on the last page satisfies the residue threshold comprises:
applying a machine learning model to the print job, the machine learning model outputting for an input print job whether the input print job should be modified to have one fewer page.

13. The method of claim 12, further comprising:
as each of a plurality of the print jobs are printed, tracking print job information including the content on the last page of the print job and whether or not the print job was modified to have one fewer page; and
retraining the machine learning model based on the tracked print job information.

14. The method of claim 13, wherein the print job information further includes whether the machine learning model indicated that the print job should be modified to have one fewer page.

15. The method of claim 13, wherein the print job information further includes, after the print job was modified to have one fewer page and then printed, whether the print job was reprinted to not have one fewer page.

16. The method of claim 1, wherein the processor is part of a server computing device, the method further comprising:
receiving, by the processor, the print job from a client computing device that generated the print job,
wherein causing the printing device to print the modified print job comprises transmitting the modified print job to the printing device.

17. A non-transitory computer-readable data storage medium storing program code executable by a processor of a computing device to perform processing comprising:
in response to an application running on the computing device initiating printing of a print job having multiple pages, detecting, by a printer driver running on the computing device, that content on a last page of the print job satisfies a residue threshold;
in response to detecting that the content on the last page satisfies the residue threshold, modifying, by the printer driver, the print job to have one fewer page; and
transmitting, by the printer driver, the modified print job so that the modified print job is printed by a printing device.

18. The non-transitory computer-readable data storage medium of claim 17, wherein detecting that the content on the last page satisfies the residue threshold comprises:
applying a machine learning model to the print job, the machine learning model outputting for an input print job whether the input print job should be modified to have one fewer page.

19. Non-transitory computer-readable data storage medium of claim 18, wherein detecting that the content on the last page satisfies the residue threshold comprises:
as each of a plurality of the print jobs are printed, tracking print job information including the content on the last page of the print job and whether or not the print job was modified to have one fewer page; and
retraining the machine learning model based on the tracked print job information.

20. A printing device comprising:
printing hardware;
a processor; and
a memory storing instructions executable by the processor to:
receive a print job having multiple pages;
detect that content on a last page of the print job satisfies a residue threshold;
in response to detecting that the content on the last page satisfies the residue threshold, modify the print job to have one fewer page; and
cause the printing hardware to print the modified print job.

* * * * *